United States Patent [19]

Burghardt et al.

[11] Patent Number: 4,849,038
[45] Date of Patent: Jul. 18, 1989

[54] METHOD FOR DEPOSITING AN INTERLINING ON A PITCHED CABLE FOR REDUCING FRICTION AND NOISE

[75] Inventors: Franz Burghardt, Asslar; Bernd Abendroth, Ehringshausen-Katzenfurt; Martin Pfaff, Ehringshausen-Dreisbach, all of Fed. Rep. of Germany

[73] Assignee: Gesellschaft fuer Steuerungstechnik GmbH & Co., Ehringshausen, Fed. Rep. of Germany

[21] Appl. No.: 37,542

[22] Filed: Apr. 13, 1987

[30] Foreign Application Priority Data

Apr. 26, 1986 [DE] Fed. Rep. of Germany ....... 3614241

[51] Int. Cl.[4] .................. B65H 81/06; F16C 1/20
[52] U.S. Cl. ..................... 156/172; 74/458; 156/273.9; 156/309.6
[58] Field of Search ............... 74/501 R, 502, 501 E, 74/424.6, 425, 422, 458; 156/172, 195, 309.6, 273.9, 279, 309.9; 428/90, 372

[56] References Cited

U.S. PATENT DOCUMENTS

| 2,211,790 | 8/1940 | Pile ................................ 74/501 E |
| 2,723,705 | 11/1955 | Collins ........................ 156/185 X |
| 3,382,662 | 5/1968 | Seelig et al. ................ 428/90 X |
| 3,788,918 | 1/1974 | Poulsen ........................ 156/195 X |
| 4,010,054 | 3/1977 | Bradt ............................ 156/195 X |
| 4,411,168 | 10/1983 | Yoshifuji . |
| 4,453,922 | 6/1984 | Glaser ......................... 156/73.1 X |
| 4,625,504 | 12/1986 | Burghardt .................... 57/7 X |

FOREIGN PATENT DOCUMENTS

| 1283031 | 11/1968 | Fed. Rep. of Germany . |
| 1575715 | 10/1969 | Fed. Rep. of Germany . |
| 3124444 | 12/1982 | Fed. Rep. of Germany . |
| 44-5041 | 3/1969 | Japan . |
| 1256972 | 12/1971 | United Kingdom . |

*Primary Examiner*—Michael W. Ball
*Assistant Examiner*—Geoffrey L. Knable
*Attorney, Agent, or Firm*—Gilbert L. Wells

[57] ABSTRACT

The invention concerns a method for depositing an interlining reducing friction and noise on a pitched cable consisting of a metal wire rope with a threaded helix. The preferred method consists in using a thermoplastic filament and raising the pitched cable to a temperature higher than the melting point of the thermoplastic used, and thereupon, winding the filament between the heated threads of the helix so that the flocks or hairs fuse or sinter to the metal wire and adhere.

6 Claims, 2 Drawing Sheets

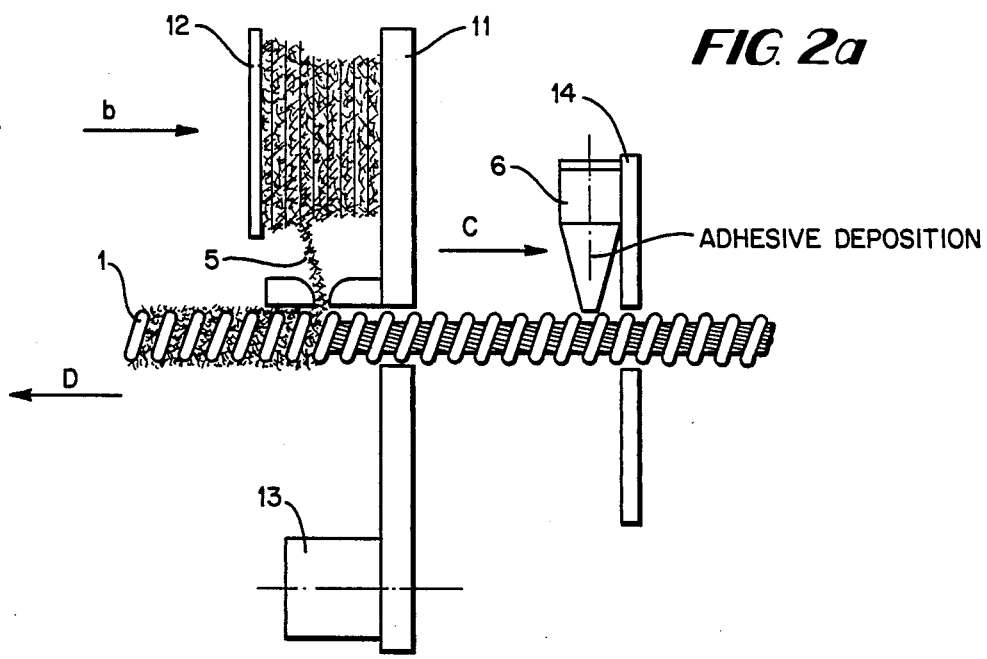
FIG. 2a
ADHESIVE DEPOSITION
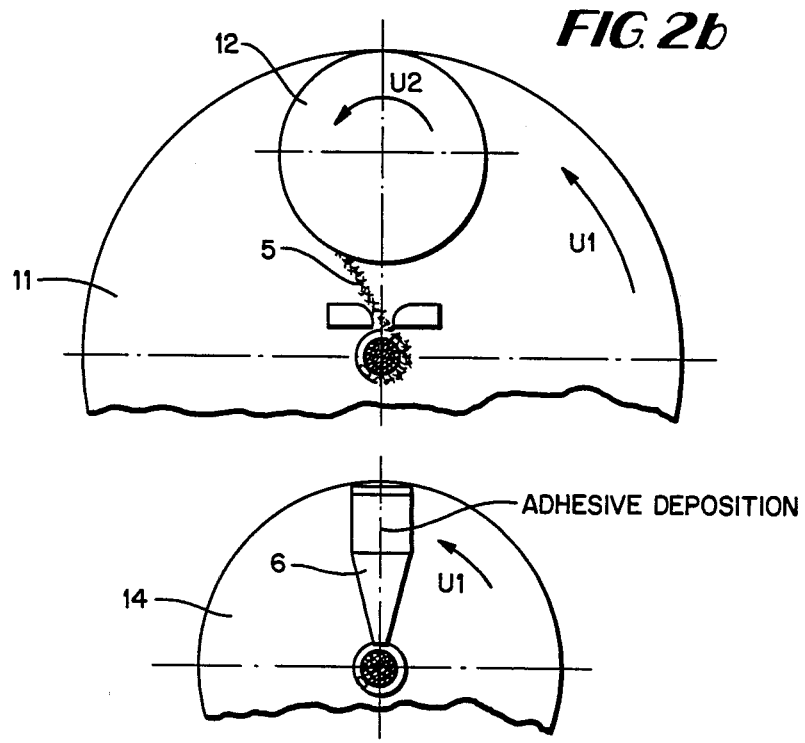
FIG. 2b
ADHESIVE DEPOSITION
FIG. 2c

METHOD FOR DEPOSITING AN INTERLINING ON A PITCHED CABLE FOR REDUCING FRICTION AND NOISE

CROSS-REFERENCES TO RELATED APPLICATIONS

Applicants claim priority under 35 USC 119 for application P 36 14 241.7 filed Apr. 26, 1986 in West Germany which in turn is a continuation of application P 35 13 093.8 filed Apr. 12, 1985 where the priority is lost.

BACKGROUND OF THE INVENTION

The invention concerns a method for depositing an interlining reducing friction and noise on a pitched cable.

The expression "pitched cable" herein denotes a gear cable on which is wound a helical wire fixed to the wire rope and having a constant, thread-like pitch.

Such pitched cables are used in operation, for instance, with a pinion meshing in the manner of a gear-rack/pinion drive with the pitched helix. Illustratively, it is known to use such components to drive motor vehicle sunroofs, the pitched cable assuming the function of a flexible gear rack guided in a tube.

The state of the art of these pitched cables as used in sunroofs may be ascertained by reference to West German Pat. Nos. 1,283,031 and 1,575,715 and West German published application No. 3,124,444, the disclosures of which are incorporated by reference.

However, such drive devices suffer from the drawback that the pitched cable tends to rattle in the guide tube. To suppress this undesirable noise, it is already known from West German published application No. 3,124,444 to coat the pitched cable with a noise reducing layer of polymer foam.

Furthermore, West German Pat. Nos. 1,283,031 and 1,575,715 suggest toward the same end to flock the inside wall of the guide tube with short fibers of an abrasion proof material.

Both proposals, however, incur the drawback that their reduction to practice is exceedingly difficult. Both the introduction of a uniform layer of polymer foam between the pitched cable and the inside wall of the guide tube, on the one hand, and a uniform flocking of the tube inner wall on the other, require substantial engineering effort not necessarily assured of success, which would be a uniform, noise-reducing interlining between the pitched cable and the tube.

SUMMARY OF THE INVENTION

Having in mind the limitations of the prior art, it is an object of the present invention to provide such a pitched cable in simple manner with an interlining.

This object is achieved by two embodiments of the present invention, wherein a filament already flocked with an abrasion proof material is wound into the virtual thread grooves of the helix of the pitched cable.

In the first embodiment, an adhesive is introduced between the threads of the helix of the pitched cable and then a flocked filament of tape is wound between the threads of the helix.

According to another embodiment, the flocked filament consists of a thermoplastic material and the pitched cable is raised to a temperature beyond the melting point of the thermoplastic material. When the flocked filament is wound between the seated threads of the helix, the flocks or hairs fuse (sinter) and adhere to the metal.

These methods offer the special advantage that the same flock thickness is achieved everywhere in the pitched cable, provided the filament is uniformly flocked, and that the filament winding is quite easy to carry out commercially. In lieu of the flocked filament, a flocked tape may also be used, and in some cases, flocking is not required at all when the tape or filament is sufficiently thick and elastic.

The tape or the filament is wound either so tightly that further fastening is unnecessary, or additionally, an adhesive is deposited on the pitched cable (preferably before winding the filament or tape) to assure adequate fixation of the filament in the grooves of the helix or the pitched cable is heated to the melting point of the filament so that the filament sinters in the grooves of the helix.

The filament deposition or winding is carried out commercially in several modes. Either the pitched cable is made to rotate, in which event the filament or tape supply container, almost always a spool, is at rest, or the pitched cable is at rest and the spool rotates about the cable.

In the second motion, such an exchange also is possible: either the cable is at rest and the spool moves along the cable, or the pitched cable is removed off the spool otherwise at rest.

These rotational and translational motions of the two parts can be combined in any suitable manner.

BRIEF DESCRIPTION OF THE DRAWINGS

The present invention is illustrated in the drawings in relation to two implementing modes:

FIG. 2a schematically shows winding the filament when the pitched cable does not rotate; and FIGS. 2b, 2c are elevations of FIG. 2a in the directions of the arrows b,c.

DESCRIPTION OF THE PREFERRED EMBODIMENTS

Figure 1A:
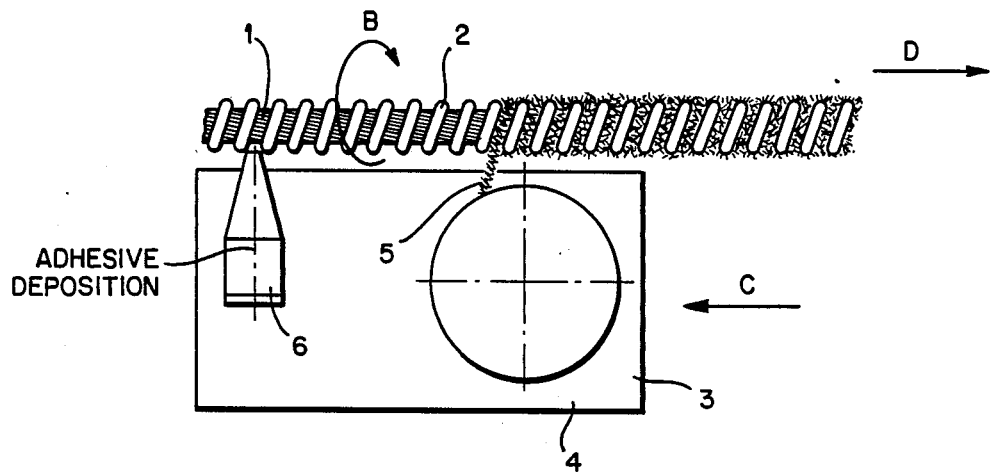
FIG. 1a is a schematic showing the winding of the filament on a rotating pitched cable with adhesive deposition.

FIG. 1a shows a pitched cable 1 provided with a threaded helix 2. A spool 4 is rotatably supported next to the cable on a carriage 3, holding a supply of flocked filament 5. Next to the spool, and on the carriage, there is a nozzle 6 permitting pressing adhesive into the gaps of the helix.

The filament 5 is wound by rotating the cable 1 in the direction of the arrow B while the carriage 3 translates in the direction of the arrow C parallel to the cable. In this mode, obviously the filament 5 is unwound from the spool 4 and wound into the threaded helix. This is carried out after an adhesive is fed from the nozzle 6 between the threads of the helix.

There need be no motion of the carriage 3, i.e., it may remain stationary, when the pitched cable rotates in the direction of the arrow B and, furthermore, the cable also is displaced in the direction of the arrow D.

Figure 1B:
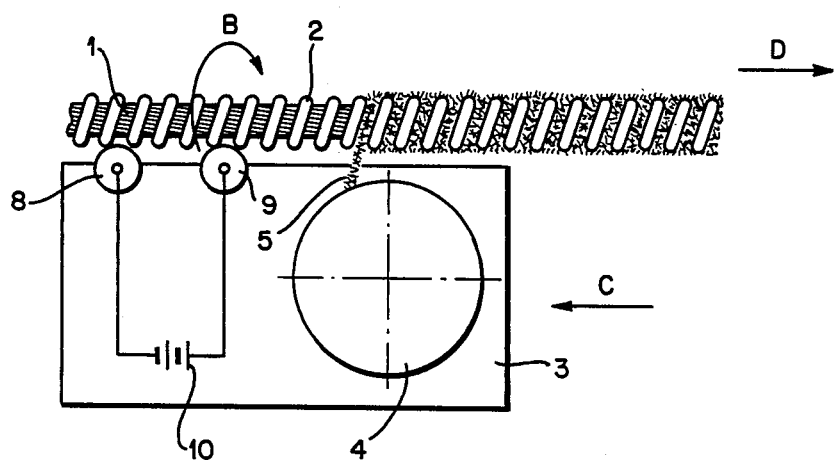
FIG. 1b is a schematic showing the winding of the filament on a rotating pitched cable with resistance heating of the cable.

According to FIG. 1b, the cable 1 is heated by passing a direct current through the cable between electrode pulley wheels 8 and 9 spaced about 15 inches apart. The direct current is generated by a DC power source 10. A current of about 3-5 amperes heats the cable to approximately 220 degrees centigrade. Heating can also be applied with a flame or with a current by way of induction heating.

FIGS. 2a-2c show apparatus to carry out the method, by means of which an irrotational but longitudinally displaced pitched cable is fed with the flocked filament. In this apparatus, the pitched cable 1 is moved in the direction of arrow D through a plate 11. To this plate 11 is fixed spool 12 and both plate 11 and spool 12 rotate concentrically about the axis of the pitched cable 1 in the direction of arrows U1 and U2. A counterweight 13 provides the required weight balance. The speed of rotation of the plate 11 and the rate of advance of the pitched cable are precisely adjusted relative to each other, taking into account the pitch of the helix, so the filament 5 is accurately wound between the helix threads.

Another plate 14 is mounted in front of plate 11 as seen in the direction of displacement of the cable 1, supporting the nozzle 6 for adhesive deposition. This plate 14 rotates synchronously with the plate 11. Alternatively, nozzle 6 also may be mounted on the back side of plate 11.

This technical arrangement may be modified without thereby transcending the scope of the method of the invention. In particular, the plate 11 may be integral with the winding machine. In that case, the adhesive is deposited before winding the helical wire, illustrative by an annular die through which the core cable is made to pass and which sprays the entire core cable of the pitched cable.

BEST MODE OF CARRYING OUT THE INVENTION

The embodiment of FIG. 1b is the best mode of carrying out the invention. When using an adhesive as shown in FIG. 1a, it is difficult to precisely dose the amount of adhesive. When too much adhesive is deposited, the adhesive rises upward between the threads and hardens the flocking on the filament. When insufficient adhesive is deposited, there is the danger of the filament detaching and unwinding.

Heating the cable above the melting point of a flocked thermoplastic filament provides a method of fixation free from these drawbacks.

According to the best mode, a flocked thermoplastic filament is used, the pitched cable is raised to a temperature beyond the melting point of this thermoplastic, and the flocked filament is wound in such a manner between the heated threads of the helix that the flocks or hair fuse or sinter and adhere to the metal.

Suitable flocked filament is made from polyamide filaments such as epsilon caprolactam and 6-6 nylon.

The space between wheel electrodes 8 and 9 of FIG. 1b is variable so that the desired amount of heating is applied to cable 1, but practically, the space is 15 inches where 3-5 amperes are applied and the cable is heated to about 220 degrees centigrade.

We claim:

1. A method for depositing an interlining reducing friction and noise on a pitched cable said interlining comprising a thermoplastic flocked filament comprising:
  (a) providing said pitched a gear cable comprising a wire rope with a helical wire wound thereabout and fixed thereto, having a constant, thread-like pitch defining a plurality of helix;
  (b) heating said pitched cable to a temperature beyond the melting point of said thermoplastic flocked filament; and
  (c) winding said thermoplastic flocked filament on said heated pitched cable between the threads of said helix and fusing said filament to said cable.

2. The method of claim 1, wherein a direct current is applied to a given length of said cable to provide said heating.

3. The method of claim 2, wherein said thermoplastic flocked filament is a polyamide.

4. The method of claim 3, wherein said polyamide is 6-6 nylon.

5. The method of claim 3, wherein said polyamide is epsilon caprolactam.

6. The method of claim 14, wherein said given length is about 5 inches and said cable is heated to about 220 degrees centigrade.

* * * * *